United States Patent [19]

Johnston et al.

[11] 4,120,573
[45] Oct. 17, 1978

[54] MICROFICHE READER

[75] Inventors: Robert F. Johnston, Wildwood; Thomas R. Wells, Des Plaines, both of Ill.

[73] Assignee: Bell & Howell Company, Chicago, Ill.

[21] Appl. No.: 700,704

[22] Filed: Jun. 28, 1976

[51] Int. Cl.² ............................................. G03B 23/08
[52] U.S. Cl. .................................................. 353/27 A
[58] Field of Search ........................... 353/27 A, 27 R

[56] References Cited

U.S. PATENT DOCUMENTS

| | | | |
|---|---|---|---|
| 3,071,753 | 1/1963 | Fritze et al. | 353/27 A |
| 3,528,735 | 9/1970 | Bluitt et al. | 353/27 A |
| 3,720,464 | 3/1973 | Ditscheid | 353/27 R |
| 3,743,400 | 7/1973 | Haning et al. | 353/27 A |
| 3,797,925 | 3/1974 | Smitzer | 353/27 R |

*Primary Examiner*—Steven L. Stephan
*Attorney, Agent, or Firm*—Harry G. Thibault; Alan B. Samlan

[57] ABSTRACT

A microfiche reader stores a library file of microfiche in a cartridge which may be inserted into the reader, so that it is not necessary to manually manipulate the individual microfiche. The reader automatically extracts and feeds a selected microfiche from a cartridge and then returns it to the vacated cartridge location. A right angle rack and pinion causes the extractor mechanism to provide an automatic feed mechanism which moves over a horizontal advance, raise, drop and back path so that hooks may be removed from and then returned into notches in a microfiche carrier, without damaging them. An automatic elevator mechanism positions the cartridge so that any selected microfiche may be placed on display.

21 Claims, 18 Drawing Figures

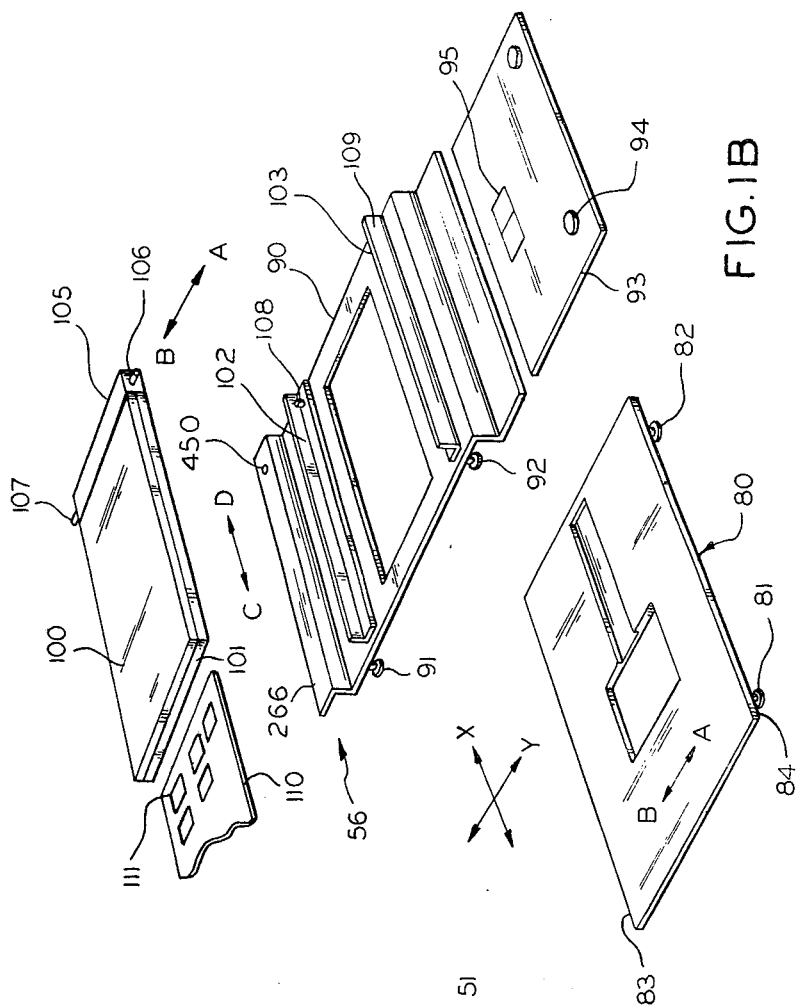
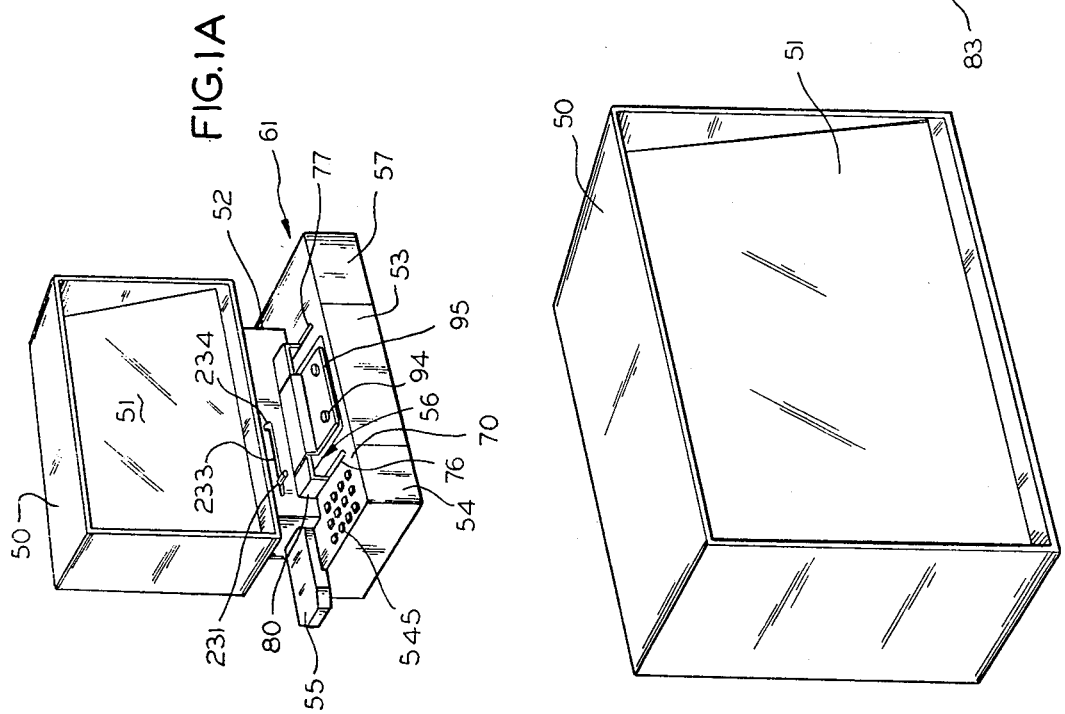
FIG.1A
FIG.1B

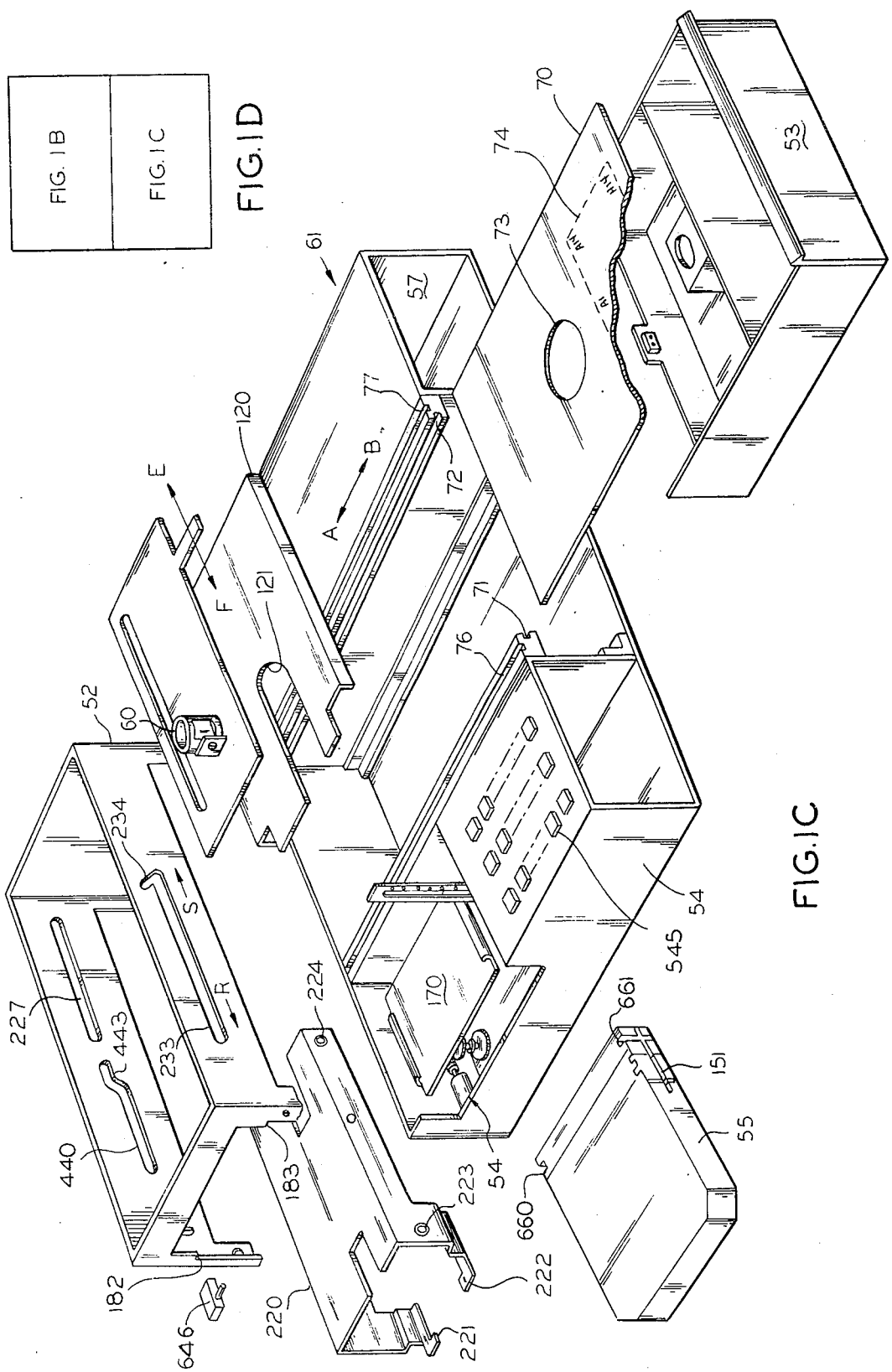

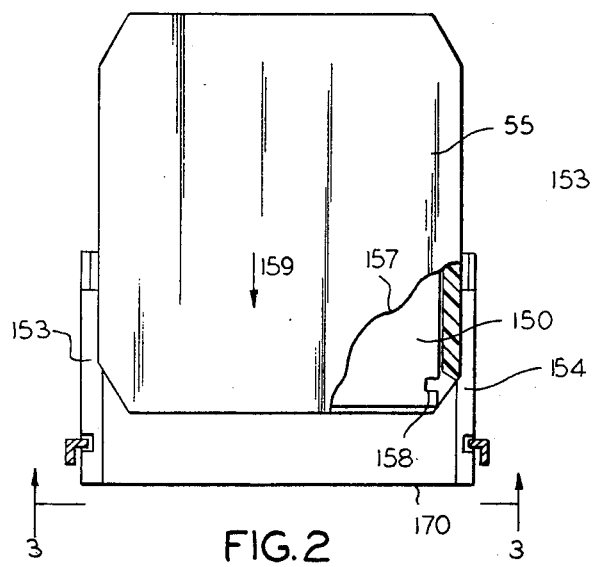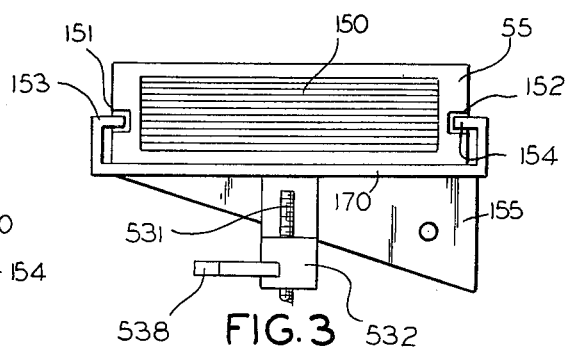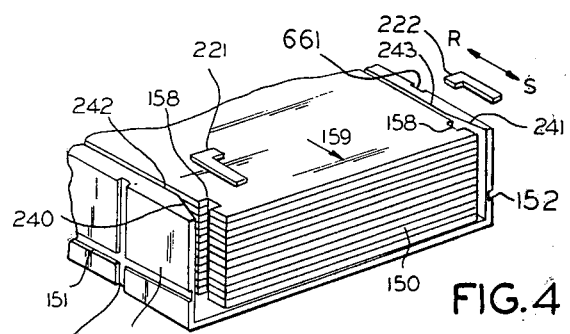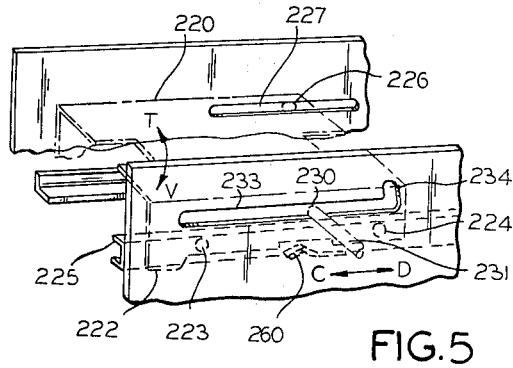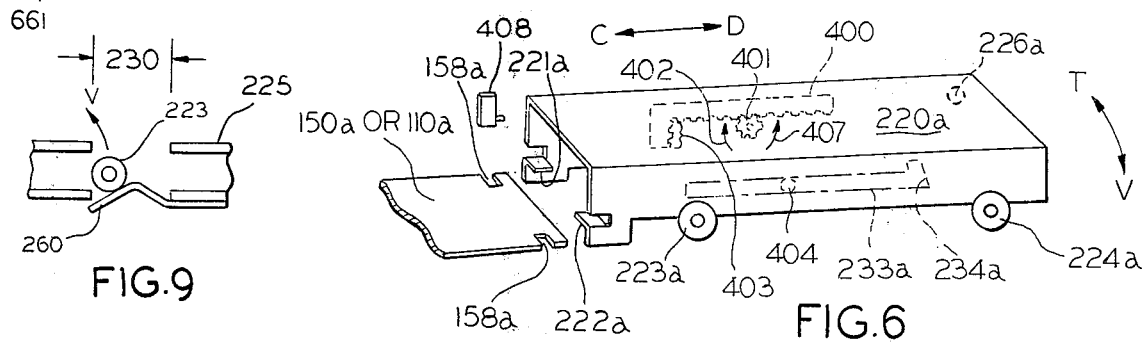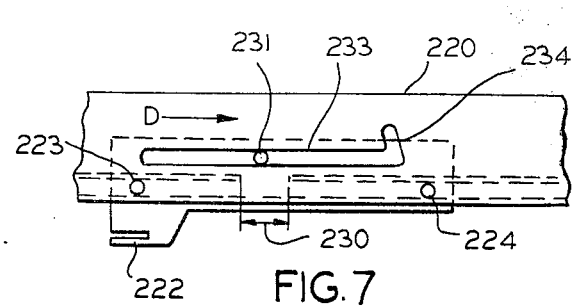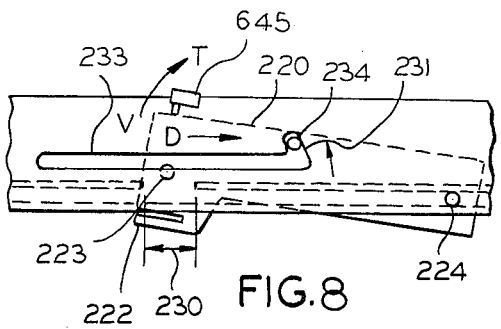

MICROFICHE READER

This invention relates to microfiche readers and more particularly to readers for automatically selecting and projecting images photocopied on microfiche, especially — although not exclusively — preloaded or preloadable in cartridges which may simply be inserted into and fed automatically through the reader.

Reference may be made to a copending application, Ser. No. 532,803, filed Dec. 16, 1974 by Thomas R. Wells, inventor, entitled Microfiche Reader, and assigned to the Assignee of this invention, for a more full and complete disclosure of some of the structure shown in the attached drawings. Those parts of the disclosure in the co-pending application which are not immediately germane to the new and improved extractor, will not be redescribed here.

Microfiche film is a known form of graphic data presentation wherein a number of pages are photographically reproduced on a single "card" of microfiche film (such as a card of 3 inches × 5 inches to 4 inches × 6 inches, for example). The microfiche film may be moved through an optical reader, with a rectilinear motion, until a selected image is positioned in an optical projection path leading to a display screen.

It would be uneconomical to have a microfiche reader system for a single microfiche card. The user is likely to have an entire library file including many microfiche which must be kept in a specific order for quick recall. Therefore, it should be apparent that use of microfiche involves filing and storing in a library file, removal and mechanical manipulation of the microfiche, and then refiling in the library file. It is extremely handy if many of these filing and manipulative functions may be accomplished completely automatically.

The mechanical manipulation of a microfiche involves sliding the microfiche into and out of the library file. Then, it must be placed in a carrier (usually between glass plates in the reader). Next, the carrier must be moved in X and Y directions, over a rectilinear path until the selected image in the orthogonal array of images is positioned in the optical path of a projector. Thereafter, the microfiche is removed from the reader and returned to the library file.

The mechanical microfiche reader equipment may be designed to manipulate the cartridge, to find and automatically extract the desired microfiche and, after use, to return it without damage to its proper library file location within the cartridge.

An object of the invention is to provide new and improved microfiche readers using cartridges for storing library files. In greater detail, an object is to enable microfiche to be loaded into many cartridges which may then be automatically selected and inserted into the microfiche reader.

A further object is to provide a simple and obvious form of operation which may be employed by people who have no special training in the use of a microfiche reader. Here an object is to enable, say a casual patron of a public library, for example, to use the reader after having received only the simplest form of instructions. In particular, an object is to interlock parts to prevent misoperation and to provide means for freeing jams.

In keeping with an aspect of the invention, these and other objects are accomplished by providing a microfiche reader having a number of mechanically interacting parts. A cartridge containing a library file may be inserted into an elevator of the reader which is then operated automatically, responsive to a selection mechanism, until a selected microfiche is brought adjacent an extractor mechanism. The extractor automatically withdraws the microfiche from the cartridge and passes it through the reader and onto a carrier. The carrier moves and a selected image comes into an optical path which projects it onto a screen. Thereafter, the microfiche is returned to the same location in the cartridge from which it was extracted. A novel, right angle rack and pinion is provided for causing the extractor to follow an automatic feed path which extracts and returns the microfiche, without damage. A novel jam release mechanism enables a jammed cartridge to be removed.

The nature of a preferred embodiment of the invention may be understood best by a study of the attached drawing wherein:

FIG. 1A shows the inventive microfiche reader in perspective;

FIGS. 1B and 1C (when assembled as shown in FIG. 1D) form an exploded view of the inventive reader;

FIG. 2 is a plan view of a microfiche cartridge as it is being inserted into an elevator mechanism built into the reader;

FIG. 3 is a front elevation view taken along line 3—3 of FIG. 2;

FIG. 4 is a schematic view, in perspective and with a cover removed, of an end of the cartridge positioned adjacent an extractor mechanism;

FIG. 5 is a perspective view of a manual extractor mechanism;

FIG. 6 is a perspective view of the device of FIG. 5 with the new and improved right angle rack and pinion for guiding and directing the extractor in an automatic manner;

FIG. 7 is a first stop motion, schematic view of the extractor mechanism shortly after the start of the microfiche extraction process;

FIG. 8 is a second and similar stop motion, schematic view at the end of the extraction process;

FIG. 9 is a schematic disclosure of how the extractor hook is lifted to the FIG. 8 position without damage to the microfiche;

Figure 10:
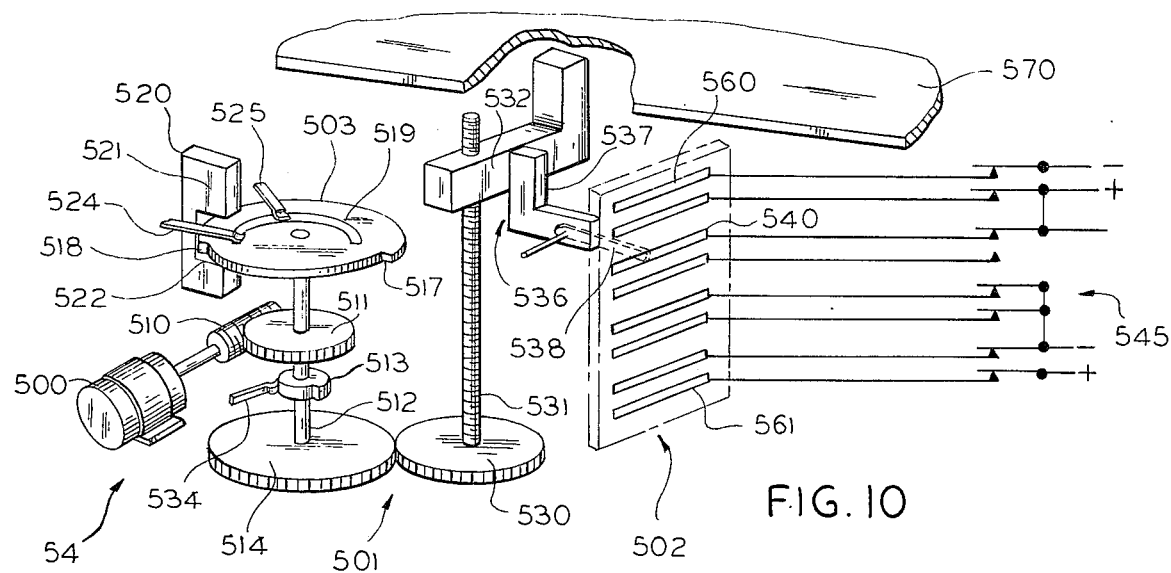
FIG. 10 is a perspective view of an automatic elevator operation mechanism.
Figure 11:
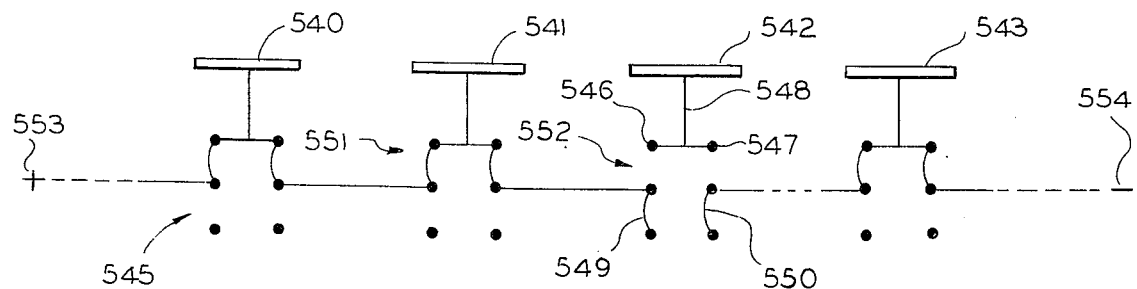
Figure 12:
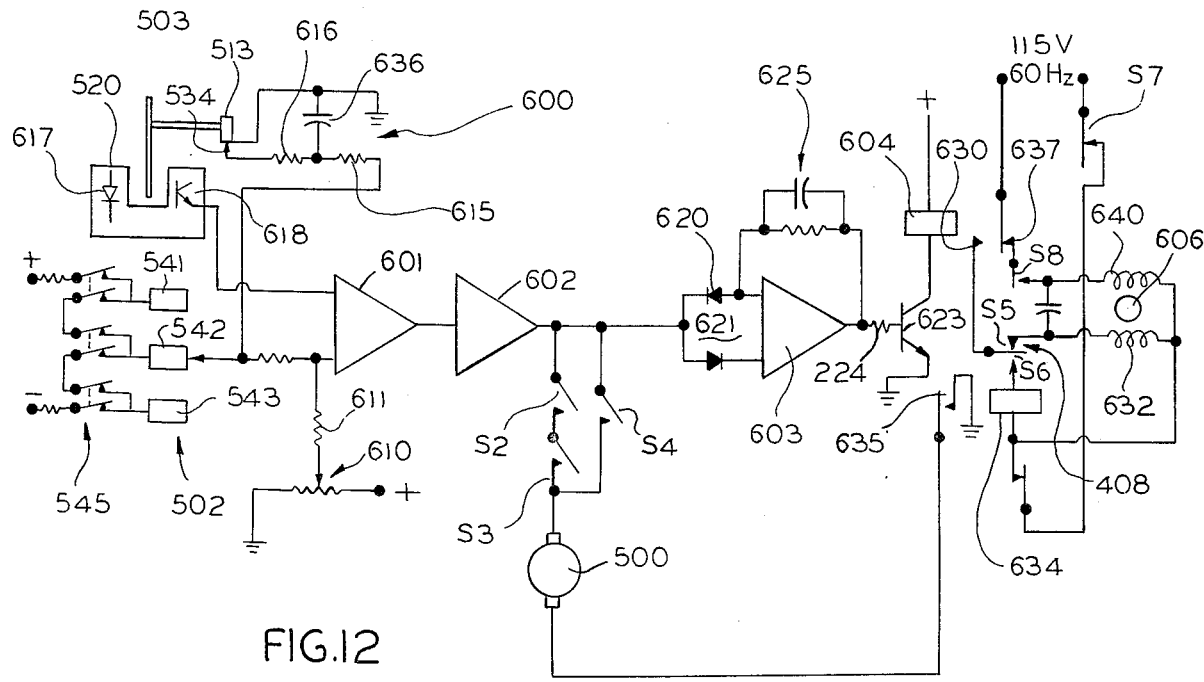
Figure 13:
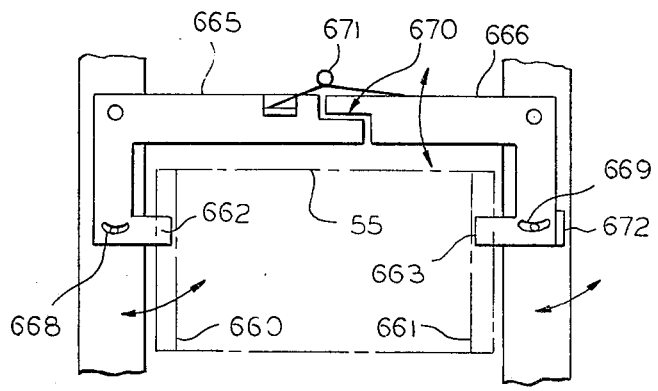
Figure 14:
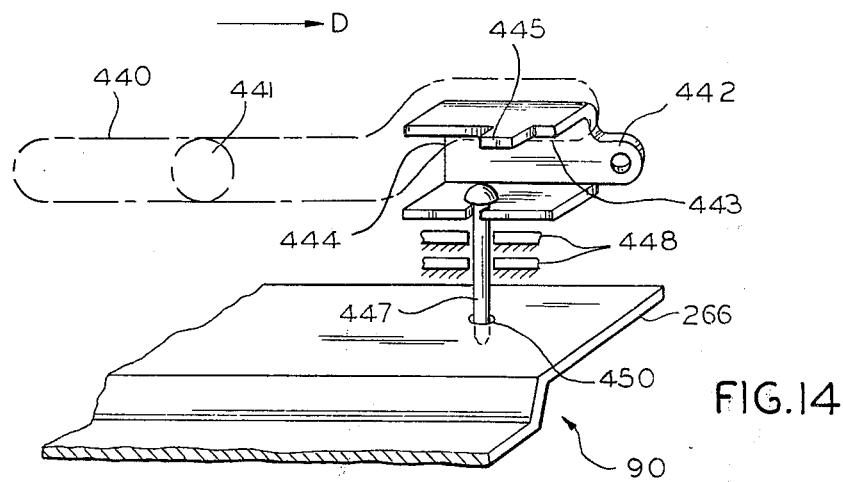
Figure 15:
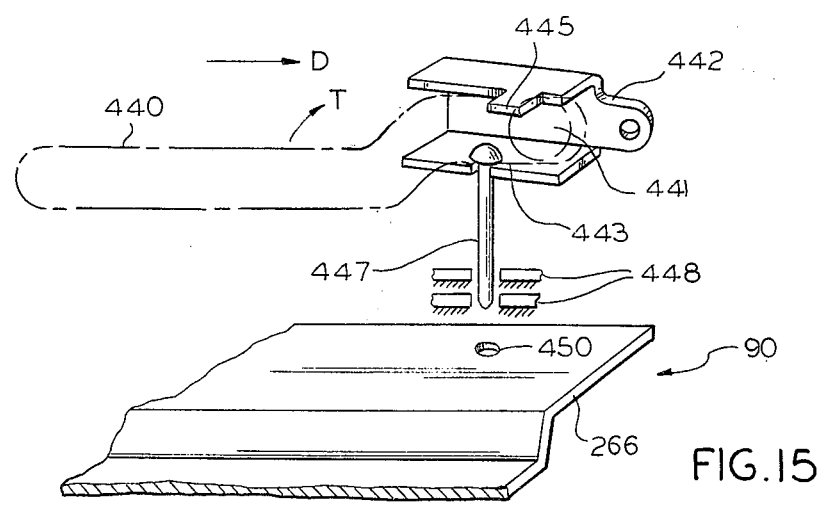

FIG. 11 schematically shows an electrical direction control and cartridge position locater circuit;

FIG. 12 shows an electrical circuit using the control circuit of FIG. 11 for driving the elevator mechanism of FIG. 10;

FIG. 13 shows a front elevation of a jam release mechanism;

FIG. 14 schematically shows an interlock mechanism (in a locked position) for locking an extractor mechanism, when in a home position; and FIG. 15 shows the same interlocking mechanism in an unlocked position.

The major assemblies of the inventive microfiche reader (FIGS. 1A-1D) are a hood 50, screen 51, housing 52, lamp tray 53, elevator 54, cartridge 55, carrier 56 and convenience tray 57. The hood 50 is a first self-contained unit comprising a hollow box which includes a number of mirrors (not shown) defining a folded optical path by which an image is projected onto a screen 51, such as ground glass or an equivalent plastic material. When an image on a microfiche film is placed under an image forming lens 60 (FIG. 1C), that image is projected over the folded path within the hood and onto the screen 51. The chassis of the microfiche reader is a second self-contained unit which comprises a base 61 having the housing 52 superimposed thereon. The method of completing the base to housing attachment is irrelevant, the housing could be welded to the base unit.

On the plate 70 (FIG. 1C) is printed or otherwise formed a grid or other index 74 which identifies the individual microfiche images, as by letter and number, for example. As shown in FIG. 1C, the image on an upper left portion of a microfiche may have the address A1, one on the upper right an address A14, and the one on the lower right the address H14. Likewise, every other microfiche image has a similar address. If the plate 70 is removed and inverted, rotated or replaced, the addresses of any of many different sizes of microfiche images may be provided.

Carrier means 56 are provided for manipulating a microfiche while it is out of the library file which is packed into the cartridge. This carrier is supported on a pair of spaced, parallel guide rails 76, 77 extending transversely across the top of the base unit. A rectangular lower carrier 80 has four wheels (two of which are numbered 81, 82—FIG. 1B) which roll in the tracks 76, 77. Hence, lower carrier 80 may be pushed back and forth in directions A and B. Mounted on tracks 83, 84, formed at the opposed sides of carrier 80, which are perpendicular to tracks 76, 77, is an upper carrier 90 having four wheels, two of which are numbered 91, 92, which ride on tracks 83, 84. Hence, upper carrier 90 may move back and forth in directions C, D. Accordingly, it should be apparent that the upper carrier may be rectilinearly moved in X and Y directions to almost any spot, which is within the tracks 76, 77, 83, 84.

Attached to the front of upper carrier 90 is a transparent plastic plate 93 carrying one or more knobs 94 for moving the carriers 80, 90. Crosshairs or other optical aids 95 engraved on the plastic plate 93 may be positioned over any address on scale 74 in order to locate a microfiche image under the image lens 60.

A pair of spaced parallel glass plates 100, 101 are mounted on the upper carrier 90. In greater detail, lower plate 101 lies on carrier 90 in the space between parallel side rails 102, 103. Upper plate 100 is cemented or otherwise attached to a hinge member 105 having opposed pins 106, 107 which rest in bearings 108, 109 formed in the side rails. Hence, to manually load, replace or clean a microfiche, upper glass plate 100 may be lifted and a microfiche 110 may be placed between it and the lower glass plate 101. It should now be apparent how the microfiche image 111 is placed under the image lens 60 when knob 94 is moved to place the crosshairs 95 over the address A14, for example. Likewise, any other microfiche image may also be placed under the image lens in a similar manner.

An elevator 54 is provided for raising a cartridge to a discrete level for thereby selecting a particular microfiche from a library file. In greater detail, a number of microfiche film 150 (FIG. 3) are packed in a spaced parallel relationship inside a cartridge. Shelves (not shown) are formed inside the cartridge to hold the microfiche in their respective discrete places. It is irrelevant how the microfiche are put into the cartridge. They may be inserted by the user, either by hand or by placing a microfiche film between plates 100, 101 and then allowing the reader to insert it automatically into the cartridge.

The outside vertical cartridge walls have grooves 151, 152 formed in opposite sides to receive tabs 153, 154 formed on an elevator base plate 170. As seen in FIG. 2, the cartridge 55 is being slid into place between the tabs 153, 154 on the elevator base plate. When the cartridge is snugly in place, it fits against the front of the elevator base plate 170. The top of the cartridge is broken away at 157 (FIG. 2 and removed in FIG. 4) to reveal the upper most microfiche in the library file. A pair of notches 158, 158 (FIG. 4) are formed on each of the opposing front corners of each of the microfiche so that extractor hooks 221, 222 may enter the front of the cartridge, ride up or down through the vertically aligned microfiche notches 158, 158 and stop adjacent a selected one of the microfiche. Then, the extractor hook is withdrawn in direction 159 to thereby pull the microfiche at the selected cartridge height from the library file inside the cartridge. The elevator raises or lowers the cartridge by a precisely selected distance, to thereby position the extractor hooks adjacent the selected microfiche.

In the following description, reference numerals with the suffix "a" appear in FIG. 6, which includes the inventive right angle rack and pinion. Otherwise, the same reference numerals are used elsewhere in the drawings without the suffix "a" to identify corresponding parts in all other figures.

Either manual or automatic feed means are provided for extracting the selected microfiche 150 from the cartridge 55. In greater detail, the automatic feed (FIG. 6) is provided by an extractor plate 220a (FIG. 6) which has a generally box shape with extractor hooks 221a, 222a dependent from the leading corners thereof. (The term "leading" means the end of the extractor plate which enters the cartridge.) The bottom of the extractor plate 220a has a pair of wheels 223a, 224a which ride in directions C and D along a U-shaped channel 225 on the inside front of housing 52 (FIG. 5). A third wheel 226a on the back of the extractor plate 220a rides in a slot 227 on the back of the housing 52. A flange (not shown) on wheels 226a enables extractor plate 220 to be tipped in directions T, V without pulling the wheel 226a from the slot 227. A notch 230 is cut out of the top of the U-shaped rail 225 so that wheel 223a may be lifted out of the track when the extractor plate tips up in direction T, as will be explained.

In the manual system (FIG. 5), lever 231 is fixed in a hole on the extractor plate 220 and fits through a slot 233 on the housing 52. Therefore, it should now be apparent that the extractor plate 220 rolls back and forth in directions C, D to extract, feed and return, and tips up and down in directions T, V to engage and disengage the microfiche under the control of the sliding file extraction lever 231 as it is manually moved along slot 233. The tipping motion is controlled when lever 231 slides up and down in the off vertical slot 234.

According to the automatic feed system of the invention, a right angle rack 400 is mounted on and attached to the extractor plate 220a in any convenient location to cause both the C-D and the T-V direction movements. In greater detail, the pinion 401 is mounted in a stationary bearing on the reader chassis. The rack 400 is mounted on the extractor plate 220a at a convenient location, which may preferably be somewhat midway between the vertical sides of the extractor 220. As the pinion 401 is driven in the direction indicated by arrow 402, rack 400 is moved in direction D while a detent 404 on the extractor plate 220a moves through the horizontal portions of the slot 233a. When vertical row of rack teeth 403 engage pinion 401, rack 400 moves in direction T. This causes extractor plate detent 404 to move through vertical slot 234a and to rock the extractor plate 220a in direction T.

When the process is reversed, the pinion 401 rotates in direction 407 and the vertical row of rack teeth 403 are driven in direction V. The extractor plate 220a also rocks in direction V while its detent 404 travels downwardly in vertical slot 234a. Thereafter, the pinion 401 engages the horizontal row of teeth in the right angle rack 400. This drives the right angle rack 400 and therefore extractor plate 220a, in direction C. A microswitch 408 is positioned at the forward end of extractor travel to close a switch when the hooks 221a, 222a are properly aligned with the microfiche notches.

Regardless of whether the embodiment of FIG. 5 or of FIG. 6 is used, the microfiche extraction operation should be most apparent from an inspection of FIG. 4. In greater detail, the sliding extration lever 231 is moved in direction C (FIG. 5) to the end of slot 233. This places the extractor hooks 221, 222 in a position which is over the vertical notches 158, 158 in the microfiche. The cartridge 55 is then slipped into the elevator. Tapered internal front walls 240, 241 (FIG. 4) of the cartridge cooperate with the corners on the front of the microfiche in order to guide and direct the cartridge to a position where the notches 158, 158 are directly under the extractor hooks 221, 222.

As the elevator raises or lowers, the notches 158 of a selected microfiche 150 come to rest adjacent the ends of extractor hooks 221, 222. When the sliding extraction lever 231 moves in direction D, the microfiche is pulled out of cartridge 55, with motion in direction 159. When the sliding lever 231 is pulled in direction C, the microfiche is returned into place in the cartridge from which it was extracted. Since the elevator is interlocked and not able to move while the microfiche is out of the cartridge, it is returned to the exact same place in the cartridge.

The operation of the automatic feed embodiment of FIG. 6 should now be apparent. The extractor hooks 221a, 222a may be placed over the notches 158 in the cartridge 55. Thereafter, the elevator may be raised (or lowered) to position the notches on the selected microfiche adjacent hooks 221a, 222a. The pinion 401 is driven in direction 402 to drive rack 400 (and therefore extractor 220a) in direction D, pulling the selected microfiche between glass plates 100, 101. When pinion 401 reaches vertical teeth 403, extractor plate 220a rocks in direction T to remove hooks 221a, 222a from notches in the microfiche carrier. Thereafter, the glass plates 100, 101 (carrying the microfiche between them) are moved to select and display a particular image.

After the selected image is no longer desired, the glass plates 100, 101 are returned to the loading and unloading position where the microfiche carrier notches 158, 158 are positioned under hooks 221a, 222a of the extractor plate 220a. Pinion 401 is driven in direction 407. The right angle rack 400 is rocked in direction V while the pinion teeth engage the vertical section 403 of the rack teeth. When the pinion teeth reach the horizontal teeth of rack 400, the extractor plate 220a is driven in direction C, to return the microfiche into the cartridge. The elevator may now be moved to another position while hooks 221a, 222a travel in notches 158, 158 (FIG. 4). Either another microfiche may be selected, or the cartridge may be completely removed, responsive to elevator movement.

An advantage of the structure of FIG. 6 is that an automatic microfiche feeding procedure may be adopted.

Briefly in resume of the operation described thus far, a cartridge 55 is inserted onto the elevator base plate 170 which raises or lowers while extractor hooks 221, 222 travel in the notches 158 to a selected microfiche. Next, the right angle rack 400 is driven (or sliding extract lever 231 is moved) in direction D (FIG. 7) to move extractor plate 220, thereby pulling the selected microfiche from the cartridge. The microfiche 110 (FIG. 1B) slides in between the glass plates 100, 101 of the upper carrier 90. Continued movement of the right angle rack 400 (or select lever 231) brings the microfiche 110 to the proper operating position between glass plates 100, 101. At that time it is necessary to remove the extractor hooks 221, 222 from the microfiche notches 158 and to raise the hooks above the microfiche carrier rails 102, 103 so that rectilinear carriage movement may proceed. Moreover, it is necessary to back the hooks 221, 222 somewhat in the notches 158 to avoid damaging the microfiche when the hook is lifted.

Means are provided for lifting the extractor hooks out of the microfiche notches and for releasing the carrier interlocks. In greater detail, it should be noted that the vertical end 234 of slot 233 is inclined somewhat to the left of vertical (as viewed in FIGS. 5–9). This inclination is in the direction C which is opposite to the direction D in which the microfiche travels as it is extracted from the cartridge. Therefore, when pinion 401 travels over vertical teeth 403 (or lever 231 is lifted) into slot 234a, the extraction plate is actually pushed back in direction C. This causes hooks 221, 222 to back off from the leading edge of the notch 158 which are engaged during extraction. The inclination of slot 234 is such that the hooks 221, 222 do not move back far enough to touch the trailing edge of the notch 158.

Beneath the cutout 230 in the U-shaped channel 225 is a leaf spring 260 for upwardly urging the extractor plate wheels 223, 224. When wheel 224 rolls over the leaf spring 260, the leaf spring has no effect because detent 404 (or lever 231) is then moving in the horizontal slot 233 to restrict any lifting movement. Thus, the wheel 224 rides smoothly past cutout 230 and continues its travel in the U-shaped channel 225.

When the extractor plate 220 reaches the operating position, at the extremity of its excursion in direction D, detent 404 (or lever 231) is opposite the vertical slot 234a and wheel 223 is opposite cutout 230. The light spring 260 tends to form an inclined plane as shown in FIG. 9, with a resulting wheel 223 motion in direction T. This means that the hooks 221, 222 will be backed slightly and also lifted in direction T, thereby clearing notches 158 in the microfiche without touching them. As a result, the extraction plate 220 is tipped, as shown in FIG. 8, thereby raising the hooks 221, 222, out of the space between the L-shaped carrier rails 102, 103 (FIG. 1B). The microfiche may be moved freely to any location so that cross hairs 95 may be placed over any image locator index at 74 (FIG. 1C).

A number of interlocking mechanisms are provided for carrier 56 to prevent it from being moved while a microfiche is being taken out of the cartridge and moved into the reader. Heretofore, the interlock has tended to be a structure which required a precise fit of mechanical parts. While the precise fit served the interlock needs very well, it required the carrier 56 to move over a precise path so that interlocking parts may come together. It would be preferable for the parts to interlock, regardless of the path followed by the carrier 56.

From FIG. 1A, the carrier 56 is moved as far as it will go to the left and toward the back of the reader. There, it should lock into position so that it cannot move during extraction or return of a microfiche. Next, the extractor handle 231 is moved to the left to enable the extractor to reach into the cartridge 55. Then the handle 231 is moved to the right, and a microfiche is extracted and brought into the carrier 56. During this entire period, the microfiche could be damaged if the reader parts are moved improperly. Therefore, the interlock prevents such movement. Accordingly, the interlock should be applied at the start and removed at the end of the extractor travel.

According to the invention, the vertical back panel of the reader housing 52 (FIGS. 1C, 14 and 15) includes a generally horizontal slot 440 having a somewhat Z-shape, with a width and other dimensions forming a rail for a wheel 441 mounted on the back of the rear vertical panel of the extractor 220.

On the outside of the housing 52 is a pivoted actuator 442 having a generally U-shaped cross-section 444 aligned with the lower horizontal portion 443 of the Z-shaped slot 440. A tab 445, formed on the U-shaped section, normally rests on the bottom 443 of the upper horizontal section of the Z-shaped slot. Loosely depending from the actuator 442 is a pin 447 which slides vertically through guides 448, formed on housing 52. The bottom of pin 447 is aligned over a hole 450 formed in shelf or plate 266 on the upper carrier 90.

Near the end of extractor travel (in direction D), the wheel 441 on extractor 220 enters the U-shaped channel 444 of the pivoted actuator 442. In the final, short increment 443 of extractor travel, the wheel 441 moves upwardly while the extractor tips upwardly in direction T. As wheel 441 raises in direction T (FIG. 15), the pivoted actuator 442 raises in direction T. This lifts the pin 447 out of hole 450.

Thereafter, the carrier 90 is free to move in any direction. After the microfiche is read, the carrier 56 may be returned over any path until it reaches the extraction position. There, the extractor 220 may be moved toward the cartridge. As soon as it moves over the distance 443 (FIG. 14), the wheel 441 drops to the bottom of slot 440 and enables the actuator 442 to lower pin 447 into the hole 450, and locks the carrier 90.

An automatic elevator mechanism (FIG. 10) may be provided to position the cartridge at a predetermined level, thereby selecting a particular microfiche in the cartridge. The major parts of this elevator include a motor 500, a gear train 501, a level indexing means 502, and a position resolver 503.

The motor 500 is any suitable power source connected to drive a worm gear 510, meshing with a pinion 511. The pinion 511 is integral, and therefore turns with a vertical shaft 512. Also, integrally mounted on and turning with shafts 512 are the resolver blade 503, a cam 513, and a gear 514.

The resolver blade 503 comprises a disc-shaped printed circuit card with an extended peripheral flange terminating at shoulders 517, 518. An arcuate printed circuit segment 519 provides an index for identifying the side of the resolver blade having the extended flange thereon. Also, the cam 513 has a profile which helps identify the blade location.

A photocell reader-combination 520 comprises a light source 521 and a photocell 522. When the extended flange of the resolver blade 503 is positioned within a slot in the photocell reader, there is no reader output. When either of the resolver blade shoulders 517, 518 pass out of the reader, there is a reader output. The bias of an associated circuit may be adjusted to give a precise response. For example, there may be an output pulse when, say 10% of the photocell is uncovered by blade 503.

A pair of wipers 524, 525 ride on the arcuate conductive segment 519 of the resolver blade 503. Therefore, a signal may be fed in through wiper 524 and an output may be picked up by the wiper 525. This way associated control circuitry knows whether it should be receiving an output signal from the photocell. The mechanical cam 513 has a profile which is cut to perform a similar control function.

The gear 514 meshes with a second gear 530 which is integrally mounted on and turns with a lead screw 531. The lead screw rides in a nut 532 mounted on the bottom of the elevator plate 170.

In one exemplary embodiment the lead screw 531 has a pitch of 40 threads per inch or 0.025 inch per thread. Thus it makes 0.08/0.025 = 3.2 revolutions for each 0.08 inch distance between fiche levels in the cartridge. The shaft 512 carrying the 180° resolver balde 503 and the 180° cam 513 is connected to the lead screw shaft 531 thru a 3.2:1 gear reducer. Thus, the blade and gear rotate one full revolution for each 0.08 inch (the exact distance between fiche levels in cartridge 55) movement of the elevator. The profiles of the cam and blade are offset from each other by 90° so that the cam driven switch 534 closes with the blade properly engaged within the slot in the reader 520. The closing of the switch 534 discharges a memory capacitor which transfers control over the elevator from the level reader 502 to the resolver blade 503. Null is reached when the appropriate blade edge 517 or 518 allows just enough light to pass between the light source and the photocell in the slotted reader 520.

Riding on and moving as a unit with the nut 532 is a level reading wiper 536. In greater detail, the reader 536 comprises a block 537 of insulating material, such as nylon, having a wiper 538 mounted thereon.

Level index means 502 is vertically mounted adjacent wiper 538. The index means comprises a printed circuit card having a commutator in the form of a plurality of spaced parallel segments (one of which is numbered 540) of conductive material printed thereon. Each segment in the commutator corresponds to a level of a particular microfiche inside a cartridge. Thus, whenever the wiper 538 is engaging a segment, it means that the cartridge is standing with a microfiche within the grasp of hooks 221, 222 of the extractor. The resolver blade 503 insures a fine adjustment of the cartridge position.

Four adjacent segments 540–543 on the level index means 502 are shown in FIG. 11. A group of switches 545 (such as pushbuttons) are provided on the microfiche reader FIGS. 1A, 1C for selectively energizing these segments. Thus, any given microfiche may be selected by an operation of a given pushbutton.

Each switch is a double pole, double throw device. One stationary set of contacts of each switch are connected together and to an individually associated one of the segments. Thus, for example, the stationary contacts 546, 547 are connected together and to segment 542 by wire 548. The other set of stationary contacts are open circuited. The movable switch blades (such as 549, 550)

may be operated in one direction to make contact with the short circuited stationary contacts, as shown at 551, for example, or in the opposite direction to make contact with the open circuited stationary contacts, as at 552, for example.

By inspection of FIG. 11, it should be apparent that a positive potential 553 is applied to all commutator segments on one side of the open set 552, and a negative potential 554 is applied to all commutator segments on the opposite side of the open set 552. This way, the polarity of a potential On wiper 538 indicates whether the elevator should move up or down. Reversely marked segments 560, 561 at opposite ends of the commutator, reverse the direction of the motor at the top and bottom of the allowable wiper travel.

Accordingly, the motor 500 rotates in one direction responsive to signals of one polarity and in the opposite direction responsive to signals of an opposite polarity. When the wiper 538 encounters a segment with no polarity, control is transferred to the resolver blade 503. The elevator lead screw turns until exactly the precise amount of light is uncovered by the blade shoulder 518 or 517.

The nature of an electronic control circuit for driving the motor is seen in FIG. 12. The level index commutator segments 541–543, switches 545, resolver blade 503, photoreader 520, and cam 513 are all shown near the left hand side of the drawing. The remaining parts of the drawing comprise a memory circuit 600, an elevator position control amplifier 601, a power amplifier 602, an integrator 603, a control relay 604, elevator drive motor 500, and fiche extractor motor 606.

Connected to the output of amplifier 602 is an interlock switch S2 which closes when a cartridge 55 is in place in the elevator. Switch S3 closes only when extractor 220 is in a position where the elevator may be permitted to move. without a danger of damage to a microfiche then being extracted. Switch S4 permits a manual override of the automatic elevator mechanism. Other interlock switches may be closed to mark "home" or load positions of the elevator, or any other suitable index position.

Also connected to the output of the amplifier 602 is amplifier 603 which is energized via two diodes 620, 621. Therefore, there is a positive output from amplifier 603 if either one of the two polarities appear at the output of amplifier 602. Accordingly, the base of transistor 623 is marked via resistor 224 depending upon whether the commutator segment is positive or negative.

A time constant circuit 625 holds the output of amplifier 603 for a delay time period which is long enough to insure that the elevator comes to a full and complete stop before the next step in the circuit operation.

Responsive to an output from amplifier 603, transistor 623 switches on to operate relay 604. Contacts 630 close to energize the lower most winding 632 of fiche extractor motor 606, via normally closed limit switch contacts S5 operated by microswitch 408. When thus energized, the extractor 220 drives a fiche into the cartridge. Responsive thereto, microswitch 408 (FIG. 6) operates and opens the switch S5 to disable the extractor motor. Contacts S6 close to operate a relay 634, and, in turn contacts 635 which enable the elevator motor 500. Accordingly, the base of NPN transistor 623 is properly driven via resistor 224 to switch the transistor on regardless of whether the commutator segment is positive or negative.

An actuation of any one of the switches 545 opens the contacts to remove a voltage from the commutator segment of the level index means 502. All other commutator segments have voltage applied through the unactuated switches, with a polarity which depends on whether the segments are above or below the dead segment. This voltage is added to the bias provided via potentiometer 610 and applied through resistor 611 to the lower input of amplifier 601. Also, the segment voltage charges the memory capacitor 636 with the same polarity via resistor 615. The polarity of the voltage so applied is fed through a power amplifier 602 to elevator drive motor 500, which causes it to drive the elevator in the direction which causes its attached wiper contact 538 to approach the dead segment. When the contact 538 engages the dead segment, the motor 500 continues to drive in the same direction because position control amplifier continues to receive the same polarity signal responsive to the charge stored in the memory capacitor 636.

When the wiping contact 538 reaches the dead segment, a charge is no longer applied via resistor 615 to the memory capacitor 636. Therefore, when the cam 513 closes contacts 534, capacitor 636 is discharged through resitor 616. The entire control over the amplifier 601 is now transferred to the resolver blade 503, here shown as being interposed between a light emitting diode 617, and a photosensitive transistor or photocell 618. The output of amplifier 601 continues until the appropriate blade edge of resolver blade 503 allows a certain amount of light to pass between the light source and the photocell in the slotted reader 520. Then the motor 500 stops turning and the elevator is in a fiche extracting position.

When the elevator reaches a complete null position, there is no voltage feeding into either input of amplifiers 602 or 603. Transistor 623 switches off, relay 604 releases, contacts 630 open, and relay 634 releases. Contacts 635 open, and the elevator cannot restart. Contacts 637 close and the fiche extractor motor 606 is energized via winding 640. This moves extractor 220 in a direction which pulls a fiche out of the cartridge, at the selected level. When the extractor 220 lifts (FIG. 8), at its rear-most position, microswitch 645 operates to open contacts S8 and thereby disable further operation of the fiche extractor motor 606.

The switch S7 is in microswitch 646 (FIG. 1C). It opens whenever the carrier 56 has a position which is other than one wherein the fiche may be inserted or removed between the glass plates 100, 101 of the carrier. Therefore, after a microfiche has been read and the carrier 56 is returned to a loading position, contacts S7 close. When a push button switch 545 is next operated, contacts 630 close, the cycle repeats, first the fiche is returned to the cartridge, then the elevator operates, and finally the finche is extracted. As shown in FIGS. 14, 15, the carrier 90 cannot be moved from the time when the extractor 220 tips downwardly in direction V until it tips back up in direction T.

The cartridge guide mechanism may be adapted so that the cartridge always may be removed to clear a jam. In greater detail, the cartridge 55 has vertical grooves 660, 661 (FIG. 1C) which may slide vertically into spaced parallel guides having shoulders 182, 183. In this embodiment, it is impossible to remove a cartridge until after it is moved downwardly, below the shoulders 182, 183. Therefore, there could be a jam condition where nothing can move.

To avoid such a jam, a pair of tabs 662, 663 (FIG. 13) are substituted for the guideways having the shoulders 182, 183. Each tab is mounted on the end of an individually associated L-shaped arm 665, 666. These arms are pivotally mounted, near the junction of the two levers forming the L-shape, with the mounting being on the same guideways which have the shoulders 182, 183. An arcuate slot 668, 669 is formed on each of the L-shaped arms to enable the tabs 662, 663 to swing inwardly or outwardly to engage or disengage the cartrigde slots 660, 661. The upper ends of the two long arms of the L-shaped arms are complimentarily shaped at 670 so that any swinging motion of arm 666 is translated to arm 665. A spring 671 normally biases the arms 665, 666 to cartridge capture position. Therefore, if a tab 672 is swung to the right (as viewed in FIG. 13) the tabs 662, 663 move out of the capture slots 660, 661 to release the cartridge.

Thosewho are skilled in the art will readily perceive how various modifications may be made within the scope and the spirit of the invention. Therefore, the appended claims are to be construed to cover all equivalent structures.

I claim:

1. An automatic microfiche extractor for use with a microfiche reader wherein a library file of microfiche is stored in a cartridge in individual microfiche carriers so that it is not necessary to manually manipulate the individual microfiche, each of said carriers having a notch formed thereon, said extractor comprising means including at least one hook for automatically engaging said notches for extracting and feeding a selected microfiche from said cartridge to said reader and then returning said microfiche to the vacated cartridge location, an elongated plate-like means having said extractor hook means dependent from one end thereof, said elongated plate-like means moving back and forth in said extracting, feeding and returning motions and tipping up and down in a microfiche engaging and disengaging motion, rack means having a row of teeth and mounted on said plate-like means for supporting the extractor, pinion means meshing with the teeth of said rack means, said rack means having a first arm extending parallel to the back and forth movement of said extractor means and a second arm extending parallel to said up and down motion, automatic feed means comprising said extractor mounting means, said rack means and said pinion means, and means responsive to operation of said pinion means for providing the automatic feed by moving said extractor over a path which extends horizontally, raises and drops so that said hook may be removed from and then returned into said notches in the microfiche carrier without damaging them.

2. The extractor of claim 1 wherein said extractor comprises said plate-like means having a generally box-shape with two of said hooks depending from a leading corner thereof.

3. The extractor of claim 1 wherein said microfiche carrier notches are vertically aligned when in said cartridge, said hook on said extractor being positioned over said vertically aligned notches when said extractor is at the start of its extraction and the end of its returning motion.

4. The extractor of claim 3 and elevator means for selectively moving said cartridge with said hook traveling through at least a part of said vertical alignment of said notches whereby said hooks are positioned adjacent a selected one of said microfiche in said cartridge, and level selection means controlling movement of said elevator for automatically detecting when said cartridge reaches a preselected position and there stopping said elevator.

5. The extractor of claim 4 wherein said level selection means comprises a vertical commutator of normally energized conductive segments, each of said segments corresponding to an individually associated microfiche in said cartridge, means for deenergizing a selected one of said segments thereby selecting the microfiche individually associated with that one deenergized, means for marking all segments on one side of said one segment with a potential of a first polarity, means for marking all segments on the other side of said one segment with a potential of an opposite polarity, and means responsive to the level selecting means encountering a polarity of one of said markings for driving said elevator to position the selected microfiche adjacent said extractor.

6. The extractor of claim 5 where said cartridge is normally inserted in said elevator when it is in a normal position and locked into said elevator when it is in an off-normal position, and means for releasing a jammed cartridge when said elevator is stopped in an off-normal position.

7. The extractor of claim 5 and manually operated carrier means for moving said microfiche when it is removed from said cartridge, and interlock means for precluding manually movement of said carrier relative to the extractor during the entire time while the selected microfiche is being removed from or returned to said cartridge.

8. The extractor of claim 5 and resolver means for precisely adjusting the position of said elevator adjacent the selected microfiche, and means responsive to said level selecting means encountering said one deenergized segment for transferring control over said elevator means from said commutator to said resolver.

9. The extractor of claim 8 wherein said resolver comprises a lead screw means for raising or lowering said elevator and a rotary blade means which turns in synchronism with said lead screw, means for detecting the angular rotary position of said blade, and means for selectively stopping said lead screw responsive to said angular detection means.

10. An automatic microfiche extractor for use with a microfiche reader wherein a library file of microfiche is stored in a cartridge in individual microfiche carriers so that it is not necessary to manually minipulate the individual microfiche, each of said carriers having a notch formed thereon, said extractor comprising means including at least one hook for automatically engaging said notches for extracting and feeding a selected microfiche from said cartridge to said reader and then returning said microfiche to the vacated cartridge location, means for mounting said extractor to move back and forth in said extracting, feeding and returning motions and for tipping up and down in a microfiche engaging and disengaging motion, said extractor plate moving on wheels which ride in spaced parallel channels, cutout means at a particular point in at least one of said channels for enabling one of said wheels to pass out of said channel as said extractor tips up, rack and pinion means positioned to tip said extractor plate when said wheel is opposite said cutout, said rack means having a first arm extending parallel to the back and forth movement of said extractor means and a second arm extending parallel to said up and down motion, automatic feed means comprising said extractor mounting means, said rack means and said pinion means, and means responsive to operation of said pinion means for providing the automatic feed by moving said extractor over a path which extends horizontally, raises and drops so that said hook may be removed from and then returned into said notches in the microfiche carrier without damaging them.

11. A generally box-shaped automatic microfiche extractor for use with a microfiche reader wherein a library file of microfiche is stored in a cartridge in individual microfiche carriers so that it is not necessary to manually manipulate the individual microfiche, each of said carriers having a notch formed thereon, said extractor comprising means including two hooks for automatically engaging said notches for extracting and feeding a selected microfiche from said cartridge to said reader and then returning said microfiche to the vacated cartridge location, an elongated plate-like means having said extractor hook means dependent from one end thereof, said elongated plate-like means moving back and forth in said extracting, feeding and returning motions and tipping up and down in a microfiche engaging and disengaging motion, rack means mounted on said plate-like means for supporting the extractor, pinion means meshing with the teeth of said rack means, said rack means having a first arm extending parallel to the back and forth movement of said extractor means and a second arm extending parallel to said up and down motion, automatic feed means comprising said extractor mounting means, said rack means and said pinion means, means responsive to operation of said pinion means for providing the automatic feed by moving said extractor over a path which extends horizontally, raises and drops so that said hook may be removed from and then returned into said notches in the microfiche carrier without damaging them, said extractor plate moving on wheels which ride in spaced parallel channels, cutout means at a particular point in at least one of said channels for enabling one of said wheels to pass out of said channel as said extractor tips up, said right angle rack and pinion being positioned to tip said extractor plate when said one wheel is opposite said cutout, an inclined plane spring baised means below said cutout means positioned to urge said wheel upwardly, whereby a wheel on said extractor plate presses said inclined plane downwardly when said extractor is positioned at a location other than where said right angle rack and pinion tips said extractor plate, and said inclined plane presses said wheel upwardly when said extractor is in a location where said right angle rack and pinion does tip said extractor plane.

12. The extractor of claim 11 and means whereby said extractor is guided in a motion which is slightly backward with respect to direction of the extraction motion when said extractor is tipped up and in an opposite direction when said extractor is tipped down.

13. The extractor of claim 11 and means for moving said microfiche when out of said cartridge, means comprising a somewhat Z-shaped slot containing a follower mounted on said extractor, said follower following said tipping of said extractor, and means responsive to vertical movement of said follower in said Z-shaped slot for selectively locking and unlocking said extractor relative to said microfiche moving means.

14. A microfiche selection and manipulation device comprising a plurality of microfiche, each of said microfiche having at least one notch therein, raising and lowering hook means fitting down, into, and lifting out of said notches for sliding a selected one of said microfiche when said hook is in the notch of said selected microfiche, elevator means for selectively moving said plurality of microfiche with the notches on each microfiche in alignment and said hook means traveling in said aligned notches whereby said hooks are positioned adjacent a selected one of said microfiche in said cartridge, level selection means comprising commutator segments for automatically detecting when said hooks reach a preselected position adjacent a desired one of said microfiche, each of said commutator segments being a conductive segment, each of said segments corresponding to an individually associated one of said plurality of microfiche, means for energizing all but one of said segments, thereby selecting the deenergized one of said conductive segments and the microfiche individually associated with that one deenergized segment, means for marking all energized segments on one side of said one segment with a potential of a first polarity, means for marking all energized segments on the other side of said one segment with a polarity of an opposite polarity, and means responsive to the polarity of an encountered one of said markings for driving said elevator means to position the hooks adjacent the selected microfiche.

15. The device of claim 14 and resolver means for precisely adjusting the position of said elevator adjacent the selected microfiche, and means responsive to said elevator means encountering said deenergized segment for switching control over said elevator means from said segments to said resolver.

16. The device of claim 14 and carrier means for moving said selected microfiche while it is outside of said plurality of microfiche, interlock means for precluding movement of said carrier means relative to the hooks during a sliding of a microfiche.

17. The device of claim 14 wherein said elevator comprises a lead screw means for raising or lowering said plurality of microfiche and resolver means comprising a rotary blade means which turns in synchronism with said lead screw, means for detecting the angular rotary position of said blade, and means for stopping said elevator responsive to said detecting means.

18. A microfiche selection and manipulation device comprising a plurality of microfiche, cartridge means for supporting said plurality of microfiche, each of said microfiche having at least one notch therein, hook means fitting down, into, and lifting out of said notches for sliding a selected one of said microfiche when said hook is in the notch of said selected microfiche, elevator means for selectively moving said plurality of microfiche with the notches on each microfiche in alignment and said hook means traveling in said aligned notches whereby said hooks are positioned adjacent a selected one of said microfiche in said cartridge, level selection means comprising commutator segments for automatically detecting when said hooks reach a preselected position adjacent a desired one of said microfiche, said elevator means having a home position for receiving said cartridge and non-home positions for selectively raising and lowering said cartridge means, means for locking said cartridge in said elevator so that said cartridge cannot be removed while said elevator is away from said home position, and jam release mechanism for releasing said locking means when said elevator is away from said home position whereby jams may be cleared.

19. The device of claim 18 wherein said locking means comprise complementary and interfering contours in said cartridge and said elevator means, and means for swinging said contours on said elevator means away from said contours on said cartridge to free said cartridge.

20. The device of claim 18 and carrier means for moving said selected microfiche while it is outside of said plurality of microfiche, interlock means for precluding movement of said carrier means relative to the hooks during a sliding of a microfiche.

21. A microfiche selector comprising a plurality of terminals, each terminal individually associated with a corresponding microfiche, means for marking a selected one of said terminals with a distinctive potential according to a selected microfiche usage, means for marking terminals on one side of said selected one terminal with a first polarity and terminals on the opposite side of said selected one terminal with an opposite polarity, said polarities being taken with respect to said distincitve potential means for scanning each of said input terminals in sequence to detect a presence or absence of said distinctive potential and for the polarity of a signal taken relative to the distinctive potential and therefore a selected microfiche usage prevailing at the time of the scan, means for driving said microfiche selector in one direction responsive to one polarity, and in an opposite direction responsive to an opposite polarity, and for stopping said selector responsive to said distinctive potential, resolver means for identifying a predetermined position intermediate said terminals for accurately positioning said selector relative to said terminal marked by said distinctive potential, and means for using the one of said microfiche which is selected according to said distinctive potential.

* * * * *